Patented June 10, 1930

1,762,453

UNITED STATES PATENT OFFICE

JOSEPH E. PERRAULT, OF WATERTOWN, AND HERBERT L. DAVIS, OF WALPOLE, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

MACHINE FOR MANUFACTURING CASINGS FOR PNEUMATIC TIRES

Application filed August 19, 1927. Serial No. 214,148.

This invention relates to an improved mechanism for manufacturing tires, and particularly relates to the molding of the several layers of fabric constituting the casing of pneumatic tires about a core. The core is a ring of substantially circular section corresponding in shape to the interior of the tire casing. Layers of fabric, shaped like wide bands, are superimposed upon this core and shaped to it. The core is rapidly rotated during the molding or forming operation of the layers thereon, and the layers or bands are caused, by the mechanism of this invention, to be molded smoothly upon the core and upon each other to conform with the circular section of the core, and this process is essentially one of spinning.

In the operation, the core with the band mounted upon its periphery is rotated rapidly, and a pair of oppositely disposed rollers, preferably shaped like discs, are pressed against the band. These discs are moved radially and laterally with relation to the core and are also automatically positioned angularly with relation to the core by the mechanism of this invention which is operated manually. After having been formed accurately and smoothly upon the core and upon each other, the gum in the fabric of which the bands are composed causes these bands to adhere to each other.

The discs embodied in this invention are oppositely disposed and may be adjusted angularly with relation to the core so as to be adapted, in the operation of the mechanism, to cores of different sizes and diameters. In other words, the discs are mounted to give them a universal movement radially with relation to the core, and laterally and angularly. The adjustments angularly with relation to the core taking place automatically and also, the normal angular relation of the discs to the core being adjustable by simple and efficient means embodied within the mechanism.

This automatic operation in the angular positioning of the discs relatively to the core during the radial movement of the discs relatively to the core is very important in performing the function of drawing down the fabric uniformly and free from wrinkles, and it is also very important that the mechanism should embody means for changing the angular relation of the discs to the core and the tire casings formed thereon for various sizes of tires, so that one machine can be used for a variety of sizes of tires.

The invention consists in the combination and arrangement of parts set forth in the following specification and particularly pointed out in the claims.

Referring to the drawings:—

Like numerals refer to like parts throughout the several views of the drawings.

Figure 1:
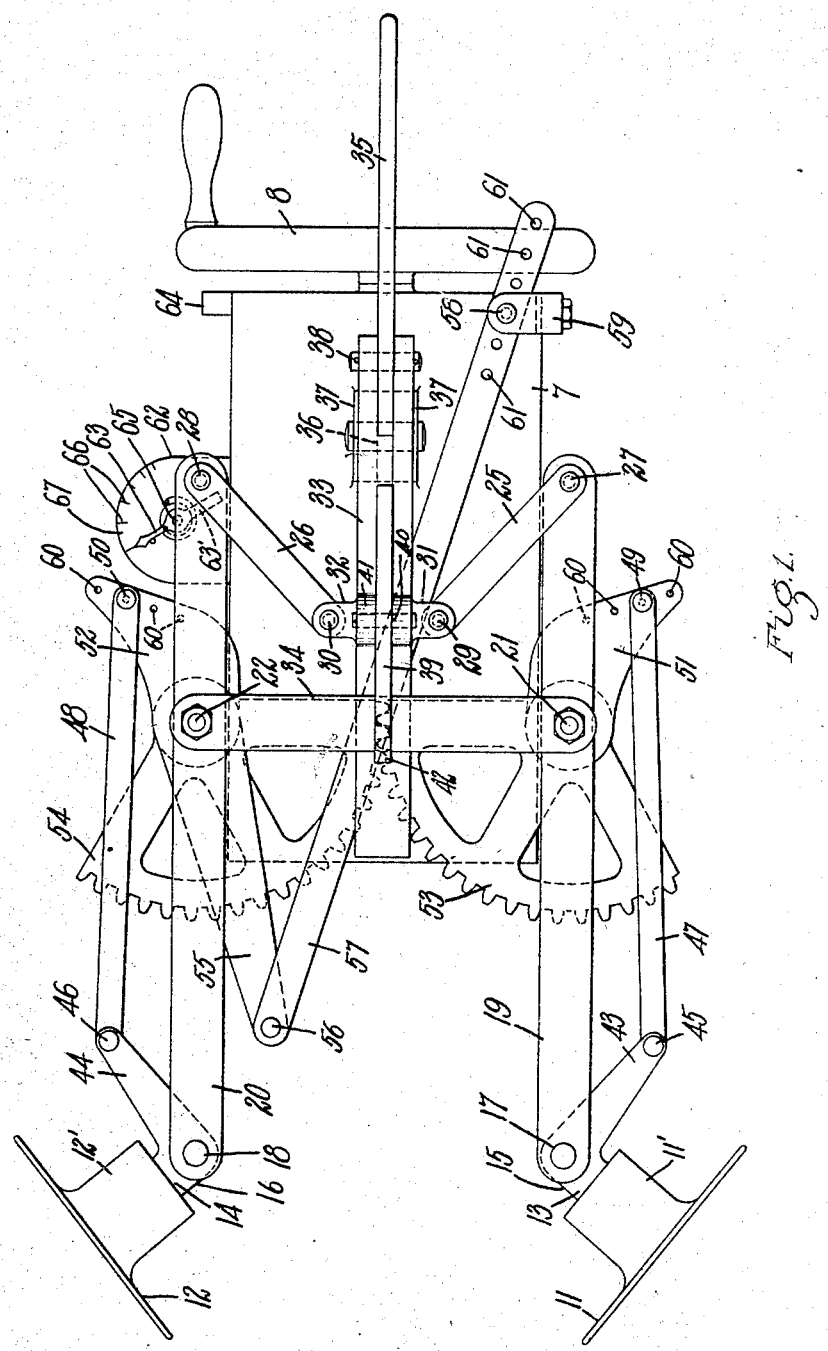
Figure 1 is a plan view of the mechanism for operating the forming discs, the core being omitted.

In the drawings, 5 is a frame which supports the tire forming mechanism, the same being generally adjustably attached to the frame of a tire making machine, so that it can be moved relatively to a rotatable core 6 to permit hand operations on the tire which is being or has been formed upon the core. A primary slide 7 is slidably mounted upon the frame 5 and is moved toward or away from the core 6 in a radial direction by means of a hand wheel 8 fastened to a screw 9 which is rotatably mounted upon the frame 5 and has screw-threaded engagement with a lug 10 on the slide 7.

The core 6, during the forming operation of the bands which compose the tire casing, is rapidly rotated by mechanism not shown in the drawings, but in a manner well known to those skilled in the art and one form of core-rotating mechanism being illustrated in United States Letters Patent No. 1,119,326, to John E. and Peter D. Thropp and Albert De Laski, patented December 1, 1914 for "Machine for making or building up pneumatic tires."

Figure 4:
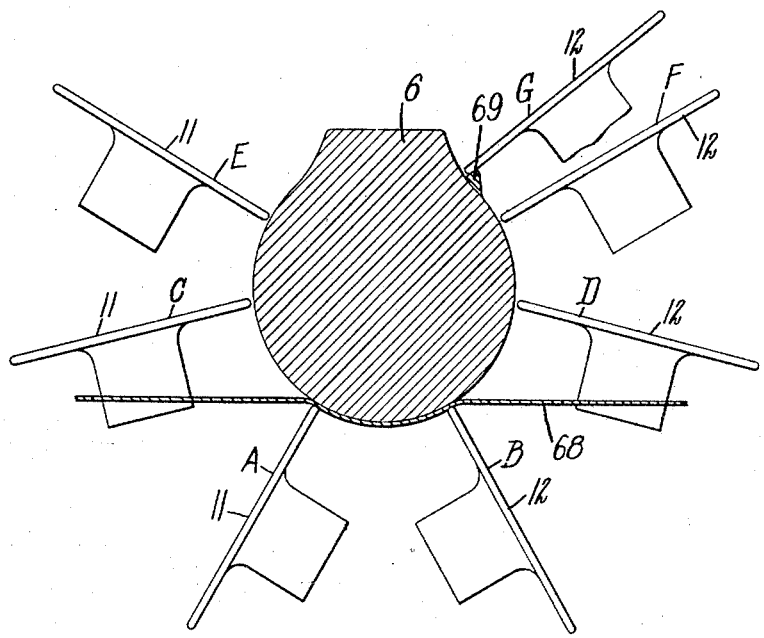
Fig. 4 is a diagrammatic view illustrating a section of the core and different positions of the forming discs relatively thereto, a band being shown in position relatively to the core as it is about to be formed thereon by the movement of the forming discs.

11 and 12 are tire forming discs rotatably mounted upon arms 13 and 14 of bell-crank levers 15 and 16. The discs 11 and 12 are oppositely disposed, the faces of said discs being positioned in planes approximately radial to that portion of the periphery of the core adjacent thereto as illustrated in Fig. 4 and the bell-crank levers upon which they are rotatably mounted are pivoted at 17 and 18 to levers 19 and 20. The levers 19 and 20 are pivoted to studs 21 and 22, which are fastened to ears 23 and 24 upon the slide 7. Links 25 and 26 are pivotally connected at 27 and 28 to the levers 19 and 20 at the opposite ends of said levers to those upon which the bell-crank levers 15 and 16 are pivotally mounted.

The links 25 and 26 are pivotally connected at their opposite ends at 29 and 30 to brackets 31 and 32 which are fastened to an auxiliary slide 33 which slides loosely in a cross bar 34, which is fastened to the upper ends of the pivotal studs 21 and 22.

A reciprocatory movement is imparted to the auxiliary slide 33 by a lever 35 which is pivoted at 36 between ears 37 forming a part of the slide 7. The lever 35 is connected by a pin 38 to the auxiliary slide 33. By rocking the lever 35 it is evident that the auxiliary slide 33 will be moved forwardly or backwardly and will thus, through the links 25 and 26, rock the levers 19 and 20 upon their pivots 21, 22 and cause the bell crank levers 15 and 16 together with the discs 11 and 12 to be moved toward or away from each other and the discs to be thus moved laterally with relation to the core 6.

In order to limit the distance to which the slide 33 can be moved rearwardly, a locking lever 39 is provided, the rear end of which is engaged by a spring 39' and which is pivoted at 40 to ears 41 on the auxiliary slide 33. This locking lever has a hooked end 42 adapted to engage the cross bar 34 and thus limit the rearward movement which may be imparted and thus normally position the auxiliary slide 33. When it is desired to operate the slide to throw the discs toward and away from each other, the operator presses upon the rear end of the locking lever 39 freeing the hook 42 from the cross bar and allowing him to press downwardly upon the lever 35 in order to rock the levers 19 and 20 and move the discs laterally with relation to the core.

In order to automatically rock the bell-crank levers 15 and 16 so as to change the angular position of the forming discs relatively to the core, arms 43 and 44 of said bell-crank levers are connected by pins 45 and 46 to links 47 and 48 which are connected at their opposite ends by pins 49 and 50 to arms 51 and 52 fast to or forming a part of segmental gears 53 and 54 which are mounted to rock upon the pivotal studs 21 and 22. These gears 53 and 54 are in mesh with each other and the gear 54 has an arm 55 which is connected by a pin 56 to a link 57, which, at the opposite end thereof is connected by a pin 58 to a bracket 59 fast to the frame 5.

The discs 11 and 12 are automatically changed in their angular relation to the core when the slide 7 is moved, by reason of the fact that the gears 53 and 54 will be moved forwardly together with the slide 7 by their pivotal studs 21 and 22. When this occurs, the link 57 being connected to the stationary pivot 58 will cause the arm 55 to impart a rocking movement to the gear 54 and hence to the gear 53, and the gears 53 and 54 being connected by pins 49 and 50 to links 47 and 48 will cause the bell-crank levers 15 and 16 to be rocked upon their pivots and thus change the angular position of the discs 11 and 12 relatively to the core.

The pins 49 and 50 may be inserted in any of the holes 60 in the arms 51 and 52 of the gears 53 and 54, and by this adjustment it will be seen that for a given rocking movement of the gears 53 and 54 the amount of angular adjustment of the discs 11 and 12 may be varied, and therefore, for a given movement forwardly or rearwardly of the slide 7, upon which the gears 53 and 54 are mounted, the angular adjustment of the discs 11 and 12 may be varied, and thus the apparatus is adapted for use with tires of different cross-sectional diameter, it being evident that for a given movement forward of the slide 7, if the links 47 and 48 are connected to pins 49 and 50, when said pins are furthest from the pivotal studs 21 and 22, the rocking movement of the levers 43 and 44 will be greater, and consequently the angular adjustment of the discs 11 and 12 will be greater than would be the case if the links 47 and 48 were connected to the arms 51 and 52 at points nearer to the pivotal studs 21 and 22.

The link 57 is provided with different holes 61 arranged longitudinally thereof and adapted to receive the pivotal pin 58 on the stationary bracket 59, so that by inserting the pin 58 in different ones of these holes 61, the link 57 will be moved longitudinally thereof to set the gears 53 and 54 in different positions, and therefore, through the arms 51 and 52 of said gears and the links 47 and 48, the bell-crank levers 15 and 16 with their respective discs 11 and 12 will be set in different positions, so that the normal angular positions of the discs may be adjusted by these means to correspond to different sizes of tires.

Hubs 11' and 12' of the discs 11 and 12 are provided with roller bearings, in order that the discs may rotate with the slightest possible friction.

From the foregoing description it will be seen that the movement of the slide 7 is accompanied by a changing angularity of the discs relatively to the core and that the original setting or normal positioning of the discs to the proper angle with relation to the core can be determined by the adjustment provided for the link 57; and the relative change in this angularity, as the slide moves forward, can be increased or diminished as hereinbefore set forth by the adjustment of the pins 49 and 50 in the arms 51 and 52.

It is evident that without departing from the spirit of this invention, adjusting means other than pins, and holes to receive them may be utilized.

The adjustments hereinbefore described enable the apparatus to be utilized for various diameters, cross sections and sizes to present the forming discs to the core at the most efficient angles and from all positions. Hence the term universal may be applied to the apparatus.

In order to inform the operator as to the amount of travel of the slide 7, an indicator 62 is provided which is fastened to the frame of the machine and has an indicator finger 63 mounted thereon, which is engaged at the proper time by a lug 64 on the slide 7, so that when the slide 7 is moved forwardly the lug 64 will engage the arm 63' of the indicator 63 and cause it to be rotated upon its pivot 65 until the pointed end thereof aligns with different indicating marks 66 on a dial 67.

Figure 2:
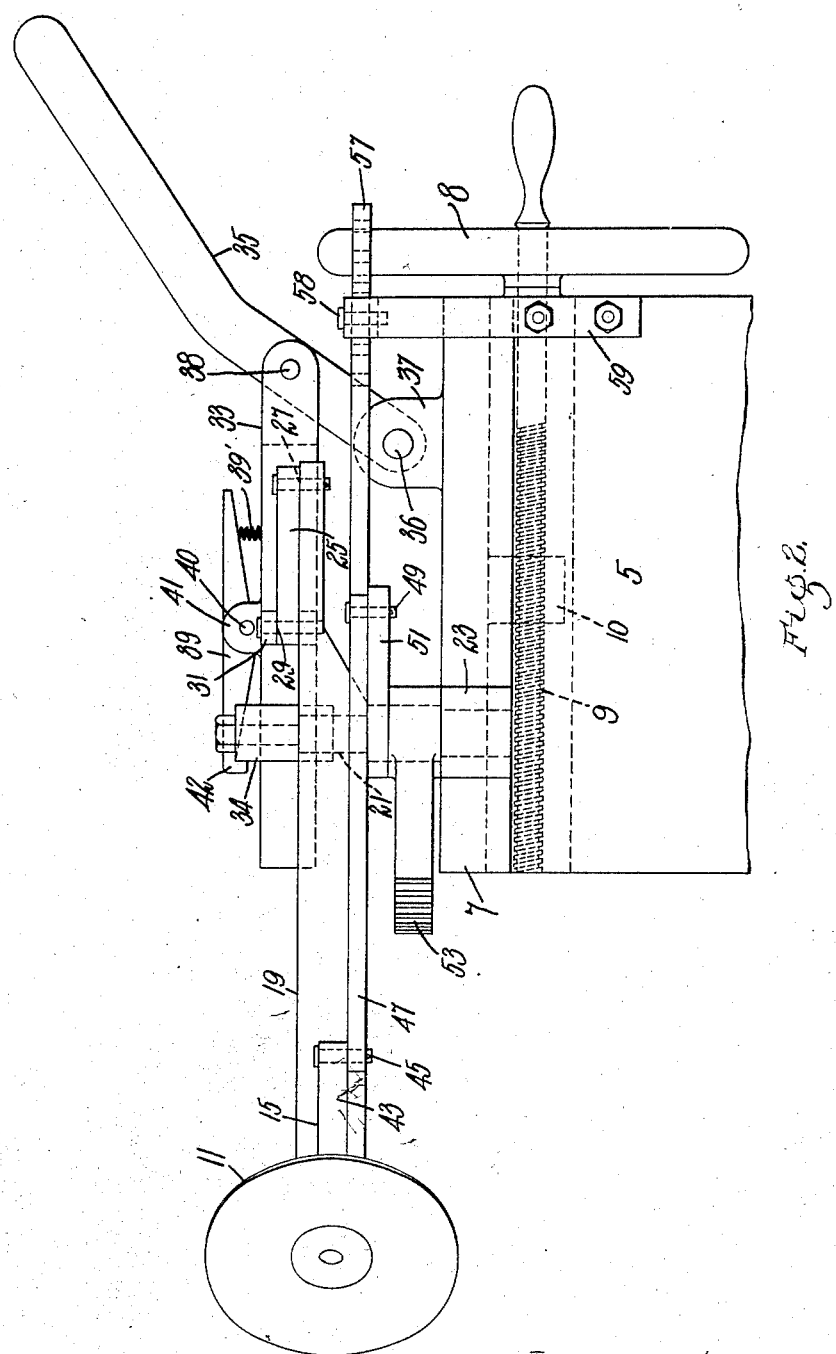
Fig. 2 is a side elevation of the same.
Figure 3:
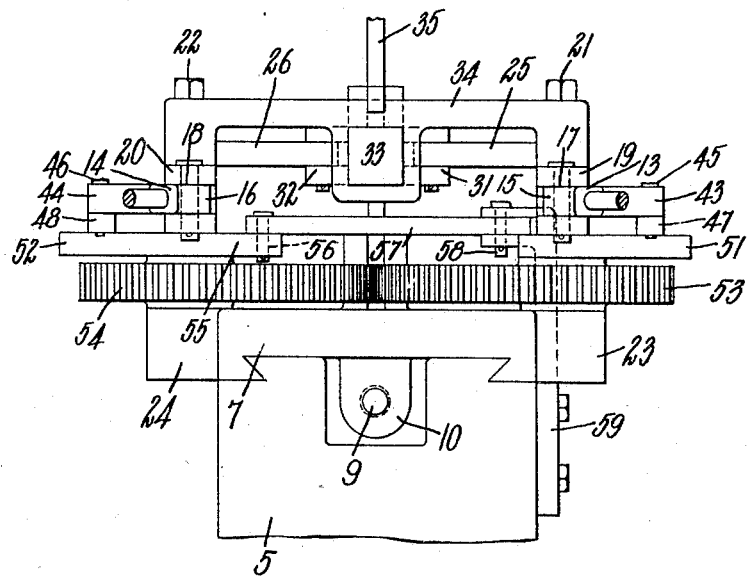
Fig. 3 is an end elevation viewed from the left of Fig. 1, the forming discs being omitted and the arms upon which they are mounted being broken off and shown in section.

The general operation of the mechanism hereinbefore specifically and to some extent in general described is as follows:—Assuming the parts to be in the relative positions illustrated in the drawings, Figs. 1, 2 and 3, and that the forming discs 11 and 12 are in the positions A and B, Fig. 4, relatively to the core, and the band 68 is positioned upon the core, as illustrated in said figure, then the operator rotates the hand wheel 8 causing the slide 7 to move forwardly until the discs assume positions C D and E F. As the slide is moved forwardly, the angular positions of the discs 11 and 12 are automatically changed, as illustrated, relatively to the core by the link 57, gears 53 and 54, links 47 and 48 and bell-crank levers 15 and 16. The discs are moved radially with relation to the core as a whole by this movement of the slide 7. They are moved laterally with relation to the core as a whole by the operation of the lever 35, auxiliary slide 33, links 25 and 26, levers 19 and 20 and bell-crank levers 43 and 44.

It will be understood that during this operation the core is revolving rapidly upon its axis and that the layer or band will be applied to it by the co-operation of the core with the forming discs moved relatively to the core as hereinbefore described.

The band or layer 68 is slightly smaller in diameter than the core ring before it is placed upon it, and this band or layer is stretched over the core. Thus, in conjunction with the rotation of the core, the band or layer 68 is wrapped about the core and the discs are presented to the surface of the core at an angle which is best suited for the function which they perform.

The angularities of the discs relatively to the core, as shown in Fig. 4, are illustrative only. The most efficient angles can only be determined experimentally by means of the adjustments hereinbefore described.

On the rear of the surface of the core 6 there is illustrated a bead 69 which extends around the core and is applied thereto in a manner well known to those skilled in the art, and it will be noted that the forming disc 12 in the position G is suitably positioned to roll the rear of the bead 69 after the said bead has been applied to the core.

By means of the lever 35, the pressure applied by the discs against the core may be regulated to obtain either a heavy or a light pressure as may be necessary in the operation of forming the band smoothly and securely upon the core.

We claim:—

1. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, mechanism to move said discs simultaneously and radially with relation to said core as a whole, and mechanism operated by said radial disc moving mechanism independently of the core to automatically change the angular relation of said discs to said core whereby the faces of said discs are caused to retain their positions in planes approximately radial to that portion of the periphery of the core adjacent thereto.

2. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, mechanism to move said discs simultaneously and radially with relation to said core as a whole, mechanism operated by said radial disc moving mechanism independently of the core to automatically change the angular relation of said discs to the core whereby the faces of said discs are caused to retain their positions in planes approximately radial to that portion of the periphery of the core adjacent thereto, and means to simultaneously adjust the normal angular relation of the discs to the core.

3. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, mechanism to move said discs simultaneously and radially with relation to said core as a whole, mechanism operated by said radial disc moving mechanism independently of the core to automatically change the angular relation of said discs to the core whereby the faces of said discs are caused to retain their positions in planes approximately radial to that portion of the periphery of the core adjacent thereto, and mechanism carried by said radial disc moving mechanism to move said discs laterally relatively to said core and simultaneously toward or away from each other.

4. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, mechanism to move said discs simultaneously and radially with relation to said core as a whole, mechanism operated by said radial disc moving mechanism independently of the core to automatically change the angular relation of said discs to the core whereby the faces of said discs are caused to retain their positions in planes approximately radial to that portion of the periphery of the core adjacent thereto, and manually operable mechanism carried by said radial disc moving mechanism to move said discs laterally relatively to said core and simultaneously toward or away from each other.

5. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, a slide movable radially relatively to said core as a whole, mechanism operated by said slide to automatically change the angular relation of said discs to the core, a pair of levers pivoted on said slide and to which said discs are pivotally mounted, and mechanism carried by said slide to rock the levers and move the discs laterally relatively to the core and simultaneously toward or away from each other.

6. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, a primary slide movable radially relatively to said core as a whole, a pair of levers pivoted on said slide and to which said discs are pivotally mounted, an auxiliary slide carried by said primary slide and slidable thereon, and a pair of links connecting the auxiliary slide to the levers, whereby the levers may be rocked and the discs moved laterally relatively to the core and simultaneously toward or away from each other.

7. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, a primary slide movable radially relatively to said core as a whole, a pair of levers pivoted on said slide and to which said discs are pivotally mounted, an auxiliary slide carried by said primary slide and slidable thereon, a pair of links connecting the auxiliary slide to the levers, and a lever pivoted to said primary slide and pivotally connected to said auxiliary slide, whereby said pair of levers may be rocked and the discs moved laterally relatively to the core and simultaneously toward or away from each other.

8. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, a primary slide movable radially relatively to said core as a whole, a pair of pivots on said slide, a pair of levers mounted to rock on said pivots and to which said discs are pivotally mounted, a cross bar connecting the upper ends of said pivots together, an auxiliary slide carried by said primary slide and slidable thereon, and a pair of links connecting the auxiliary slide to the levers, whereby the levers may be rocked and the discs moved laterally relatively to the core and simultaneously toward or away from each other, and a spring actuated locking lever pivoted to said auxiliary slide and engaging said cross bar, whereby the rearward movement of said auxiliary slide may be limited.

9. A machine for manufacturing casings for pneumatic tires having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, means connecting said gears to said bell-crank levers, and means operated by the movement of said slide to rock said gears and thereby said bell-crank levers, whereby the angular relation of said discs to said core may be changed.

10. A machine for manufacturing casings for pneumatic tires having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, a pair of links connecting said gears to said bell-crank levers, and means operated by the movement of said slide to rock said gears and thereby said bell-crank levers, whereby the angular relation of said discs to said core may be automatically changed.

11. A machine for manufacturing casings for pneumatic tires having, in combination, a rotary core constituting a form for a casing, means for rotating the core, a slide movable radially relatively to said core as a whole, a pair of levers pivoted on said slide a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, a pair of links connecting said gears to said bell-crank levers and adjustable to points at different distances from the axial center of said gears, and means operated by the movement of said slide to rock said gears and thereby said bell-crank levers, whereby the angular relation of said discs to said core may be automatically changed and the extent of said change for a given movement of said slide may be regulated.

12. A machine for manufacturing casings for pneumatic tires, having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, a pair of arms fast to said gears, a pair of links connecting said arms to said bell-crank levers and adjustable to points at different distances from the axial center of said gears, and means operated by the movement of said slide to rock said gears and thereby said bell-crank levers, whereby the angular relation of said discs to said core may be automatically changed, and the extent of said change for a given movement of said slide may be regulated.

13. A machine for manufacturing casings for pneumatic tires having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-cranks levers, a pair of gears meshing into each other and pivotally mounted on said slide, a pair of arms fast to said gears, a pair of links connected at one end thereof to said bell-crank levers, and a pair of pins on said arms and adjustable to points at different distances from the axial center of said gears and connecting said links to said arms, whereby the angular relation of said discs to said core may be automatically changed, and the extent of said change for a given movement of said slide may be regulated.

14. A machine for manufacturing casings for pneumatic tires having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, means connecting said gears to said bell-crank levers, a link pivotally connected at one end thereof to one of said gears, and a stationary pivot to which the other end of said last-named link is pivoted, whereby, upon the movement of said slide, said gears and said bell-crank levers may be rocked to change the angular relation of said discs to the core.

15. A machine for manufacturing casings for pneumatic tires having, in combination, a rotary core constituting a form for a casing, means for rotating the core, a slide movable radially relatively to said core as a whole, a pair of levers pivoted on said slide, a pair of bell-crank levers pivoted to said levers, a pair of oppositely disposed forming discs rotatably mounted on said bell-crank levers, the faces of said discs being positioned in planes approximately radial to that portion of the periphery of the core adjacent thereto, a pair of gears meshing into each other and pivotally mounted on said slide, means connecting said gears to said bell-crank levers, a link pivotally connected at one end thereof to one of said gears, and a stationary pivot to which the other end of said last-named link is pivoted, whereby upon the movement of said slide said gears and said bell-crank levers may be rocked to change the angular relation of said discs to the core, said last-named link being adjustable relatively to said stationary pivot and whereby the normal angular relation of the discs to the core may be changed.

16. A machine for manufacturing casings for pneumatic tires having, in combination, a rotary core constituting a form for a casing, means for rotating the core, a pair of oppositely disposed forming discs, the faces of said discs being positioned in planes approximately radial to that portion of the periphery of the core adjacent thereto, mechansim to move said discs simultaneously and radially with relation to said core as a whole, mechanism operated by said radial disc moving mechanism to automatically change the angular relation of said discs to the core whereby the faces of said discs are caused to retain their positions in planes approximately radial to that portion of the periphery of the core adjacent thereto, and an indicator operated by said radial disc moving mechanism to indicate its position relatively to the core.

In testimony whereof we have hereunto set our hands.

JOSEPH E. PERRAULT.
HERBERT L. DAVIS.